(12) United States Patent
Gupta et al.

(10) Patent No.: US 12,554,563 B2
(45) Date of Patent: Feb. 17, 2026

(54) OPEN SERVICE BROKER COMPLIANT SERVICE BROKER USING SERVERLESS FUNCTIONS

(71) Applicant: SAP SE, Walldorf (DE)

(72) Inventors: Abhik Gupta, Bangalore (IN); Vineet Singh, Mumbai (IN)

(73) Assignee: SAP SE, Walldorf (DE)

( * ) Notice: Subject to any disclaimer, the term of this patent is extended or adjusted under 35 U.S.C. 154(b) by 855 days.

(21) Appl. No.: 17/467,931

(22) Filed: Sep. 7, 2021

(65) Prior Publication Data

US 2023/0076345 A1    Mar. 9, 2023

(51) Int. Cl.
*G06F 9/54* (2006.01)
(52) U.S. Cl.
CPC .................... *G06F 9/547* (2013.01)
(58) Field of Classification Search
CPC ...................................................... G06F 9/547
See application file for complete search history.

(56) References Cited

U.S. PATENT DOCUMENTS

| | | | | |
|---|---|---|---|---|
| 12,014,191 B2* | 6/2024 | Gupta | ................. | G06F 16/2379 |
| 2021/0342193 A1* | 11/2021 | Anand | ................... | G06F 9/5077 |

OTHER PUBLICATIONS

Sean McKenna; Connect your applications to Azure with Open Service Broker for Azure; https://azure.microsoft.com/en-us/blog/connect-your-applications-to-azure-with-open-service-broker-for-azure/; Dec. 6, 2017; 4 pages (Year: 2017).*
Open Service Broker API; https://github.com/openservicebrokerapi/servicebroker/tree/master; Nov. 2020; 60 pages (Year: 2020).*
Azure Samples—saga-orchestration-serverless; https://github.com/Azure-Samples/saga-orchestration-serverless/blob/main/README.md; Jun. 2020; 8 pages (Year: 2020).*
James Sturtevant; Creating a Finite State Machine Distributed Workflow with Service Fabric Reliable Actors; https://www.jamessturtevant.com/posts/Creating-a-Finite-State-Machine-Distributed-Workflow-with-Service-Fabric-Reliable-Actors/; Nov. 21, 2017; 13 pages (Year: 2017).*

* cited by examiner

*Primary Examiner* — Kevin L Young
*Assistant Examiner* — Kimberly L Jordan
(74) *Attorney, Agent, or Firm* — Buckley, Maschoff & Talwalkar LLC

(57) ABSTRACT

Methods and systems may be associated with an Open Service Broker ("OSB") Application Programming Interface ("API") computing environment. A serverless runtime may receive an OSB request trigger from an API gateway. A serverless deployment mechanism may, responsive to the OSB request trigger, arrange for compute resources to handle the OSB request trigger be provisioned on-demand. The system may then instantiate an instance of a serverless function with OSB service bindings. The OSB API computing environment might, for example, be associated with a cloud infrastructure provider or an on-premises deployment. Such an approach may provide for on-demand execution, better resource constraints, and/or domain-oriented development.

20 Claims, 10 Drawing Sheets

OPEN SERVICE BROKER COMPLIANT SERVICE BROKER USING SERVERLESS FUNCTIONS

BACKGROUND

An enterprise may utilize a cloud computing environment that runs virtual machines to let users perform tasks. For example, the enterprise might let various clients or users execute Software-as-a-Service ("SaaS") applications or functions in the cloud computing environment to process purchase orders, adjust human resources information, generate invoices, etc. It can, however, be difficult for independent software vendors to create and maintain applications across various platforms and/or multi-cloud computing environments. In response to this situation, the Open Service Broker ("OSB") Application Programming Interface ("API") was developed to let independent software vendors, SaaS providers, and developers more easily provide backing services to workloads running on cloud native platforms such as CLOUD FOUNDRY® and KUBERNETES®. The protocol, which has been adopted by many platforms and service providers, describes a set of API endpoints that can be used to provision, access, and manage service offerings.

As used herein, the phrase "service broker" may refer to interactions that manage the lifecycle of services. The OSB API defines these interactions (as a result, software providers can offer services to anyone, regardless of the technology or infrastructure those software providers use). Each service broker that complies with the OSB API specification has the same set of lifecycle commands, such as commands to fetch a catalog of backing services that a service broker offers, provision new service instances, connect and disconnect, deprovision service instances, etc.

FIG. 1 illustrates an OSB API system 100. A service catalog 110 may access services 120 and receive a request from a client. Via the OSB API, a service broker 130 may provision and manage a service instance 140 and bind the service instance 140 to an application 150. Note that a service can, in some cases, be associated with a series of functions 160 (e.g., functions $F_A$, $F_B$, and $F_C$), where function $F_A$ calls function $F_B$ which, in turn, calls function $F_C$. The service broker 130 manages the life cycle of services 120, and platforms can interact with the service broker 130 to provision, access, and manage the services 120. The service catalog 110 describes all of the services that can be provisioned through the service broker 130. The service instance 140 is a provisioned instance of a service 120 as described in the service catalog 110. Once the service instance 140 is provisioned, the application 150 can begin to communicate with that instance 140. From the perspective of the service broker 130, this is called a "service binding." Deprovisioning the service instance 140 deletes all the resources created upon the initial provisioning of the service instance 140. With a unified approach as defined by the OSB API, applications can be developed and associated with any number of provisioned middleware and routing software without worrying about the underlying infrastructure (because it is all abstracted by the service broker 130).

It would therefore be desirable to facilitate creation of OSB compliant functions for a computing environment in a secure, automatic, and efficient manner.

SUMMARY

According to some embodiments, methods and systems may be associated with an Open Service Broker ("OSB") Application Programming Interface ("API") computing environment. A serverless runtime may receive an OSB request trigger from an API gateway. A serverless deployment mechanism may, responsive to the OSB request trigger, arrange for compute resources to handle the OSB request trigger be provisioned on-demand. The system may then instantiate an instance of a serverless function with OSB service bindings. The OSB API computing environment might, for example, be associated with a cloud infrastructure provider or an on-premises deployment. Such an approach may provide for on-demand execution, better resource constraints, and/or domain-oriented development.

Some embodiments comprise: means for receiving, at a serverless runtime from an API gateway, an OSB request trigger; mean for, responsive to the OSB request trigger, arranging by a serverless deployment mechanism, for compute resources to handle the OSB request trigger be provisioned on-demand; and means for instantiating an instance of a serverless function with OSB service bindings.

Some technical advantages of some embodiments disclosed herein are improved systems and methods to facilitate creation of OSB compliant functions for a computing environment in a secure, automatic, and efficient manner.

DETAILED DESCRIPTION

Figure 1:
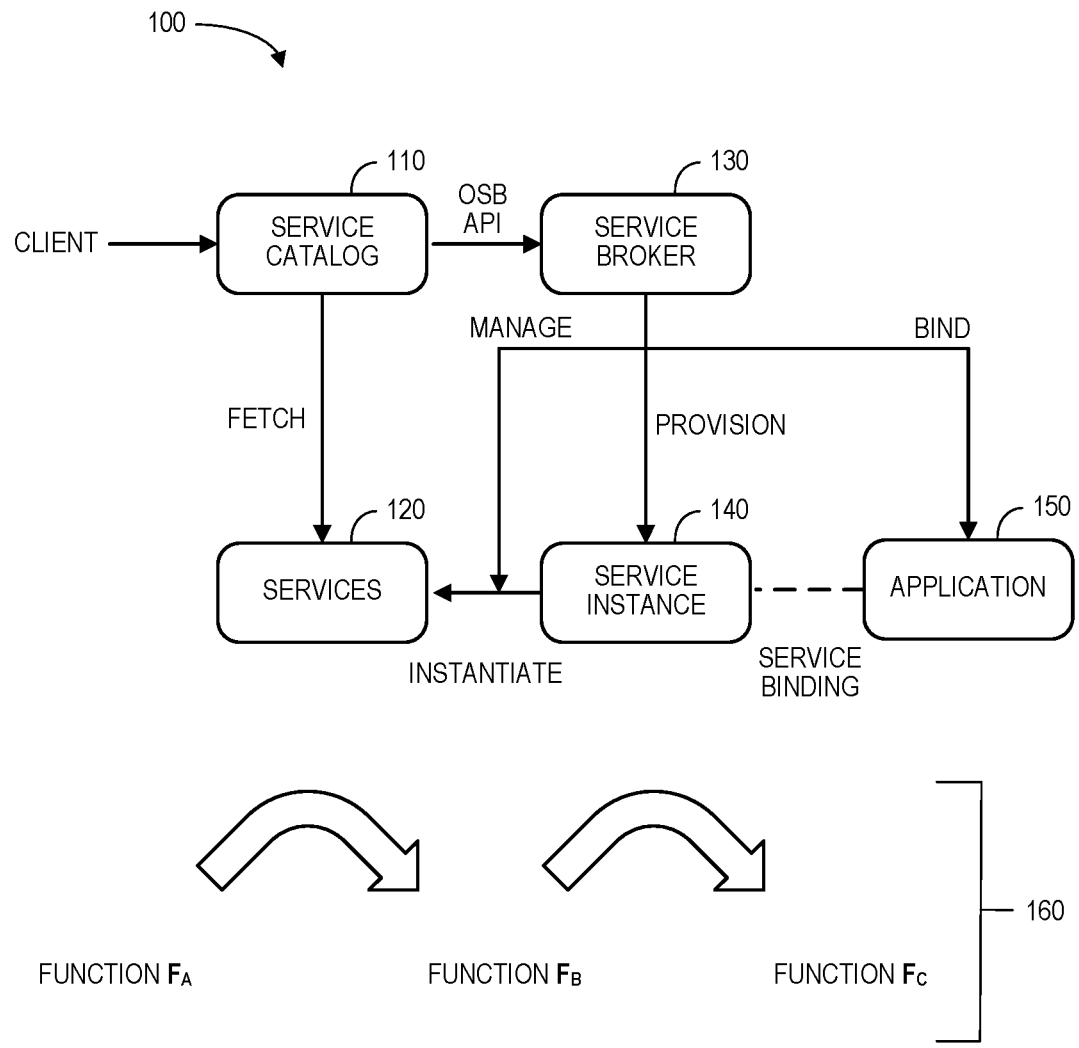
FIG. 1 illustrates an OSB API system.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The Open Service Broker ("OSB") Application Programming Interface ("API") provides a specification that lets product vendors and developers uniformly provide services to application workloads running on cloud platform providers (e.g., CLOUD FOUNDRY® and KUBERNETES®. The specification has been adopted by service providers to provision, manage, and gain uniform access to the managed service offerings. With the advancement in the field of serverless computing, developers and companies are making a shift from "serverful" to serverless architecture in their design. In addition to the cost benefits that serverless deployments can bring, the serverless deployment model also leads to increased efficiency and decreased development time for projects. Some embodiments described herein provide a new architecture and deployment model for developing OSB API compliant applications using serverless functions. The deployment model may be easily adopted on an OSB compliant cloud platform that supports the serverless computing paradigm (e.g., AWS LAMBDA® and AZURE FUNCTIONS®). The evaluation of the deployment model based on critical system parameters such as memory, availability, and compute resources show that the model provides several benefits (including reduction of deployment costs and Total Cost of Ownership ("TCO") and increased productivity as compared to commonly used server-oriented service broker deployments.

A service broker supervises and orchestrates the lifecycle of services including creation, update, and deletion of instances of the offering. Platform users interact with the service broker to provision, manage, and access instances of the service offering published by the broker. The open service broker API specification provides a standard model of interaction between the platform and service providers. The rules of standardization help software providers offer their services to anyone, independent of the technology or infrastructure the software providers utilize. OSB API compliant service brokers may have the following advantages:

1) A unified API interface: The API specification provides a singular model that the platform implements to manage the broker-provided resources on cloud environments.

2) A consistent developer experience: The API specification ensures consistent development due to its singular focus on the service offering.

3) Faster adoption: The API abstraction contributes to faster adoption of service-relevant features than usual and ensures backward compatibility by default.

4) A marketplace for all services offered by the vendor: Platforms can utilize the service offerings furnished by service brokers and publish them in a service marketplace (which is used by platform users for lifecycle management operations).

As the OSB API specification is geared towards Representational State Transfer ("REST") APIs, most service brokers are deployed as standalone, long-running server processes which react towards requests related to lifecycle management and credential access management. Service brokers are usually required to fulfill the following qualities:

High availability and fault tolerance: Service brokers need to ensure an agreed level of operational quality (such as uptime and resilience) to maintain characteristics of functional performance.

Limited Latency and reliability: Service brokers usually require fulfilling a certain degree of functional reliability to prevent user errors. This usually involves reduced latency in request processing and reliable network performance.

Load balancing: Service brokers implement stateless REST APIs, though the managed resources may be stateful in nature. Due to the inherent stateless nature of the APIs, the service broker application processes usually require balancing request processing workload across them.

These qualities incur appreciable costs and development efforts. With significant advancements in the field of serverless computing, major cloud providers support serverless function deployments for running workloads (e.g., AWS LAMBDA®). Serverless computing brings various advantages for development workflows such as reduced deployment costs, lesser development efforts and transparent availability and scalability.

Some embodiments described herein provide a niche deployment topology for service brokers using serverless functions. While the deployment mechanism naturally suits cloud infrastructure providers, it could be adapted to on-premises deployments as well (with the serverless computing paradigm being the key enabler).

Service brokers are leveraged by platform users and application workloads in the following contexts:

1) Service instance provisioning: As stated in the OSB API specification, "when the service broker receives a provision request from the platform, it MUST take whatever action is necessary to create a new resource." The provisioned resource must be identifiable in the context of the service offering and application platform.

2) Service instance update: Service brokers enable platform users and the platform to modify configuration settings, service plan and maintenance information for their managed resources.

3) Service instance deprovisioning: As stated in the OSB API specification, "when a service broker receives a deprovision request from a platform, it MUST delete any resources it created during the provision. Usually, this means that all resources are immediately reclaimed for future provisions."

4) Application credentials access: As stated in the OSB API specification, a service broker facilitates access to connection credentials for the resource and negotiates network connectivity for the application workload and resource.

After an application is bound to the broker-managed resource through the service bindings API, a continuous interaction between the application and the service broker is not required. Of course, instance updates and deprovisioning do not require a direct access to the application and could happen independently from the application's lifecycle. In lieu of this, the server-oriented deployment of brokers may typically lead to:

Longer idle uptime: A dedicated server deployment of the service broker is typically multi-tenant (i.e., a singular deployment of the broker usually caters to multiple users and application workloads on the platform). In this mode, the service broker is a continuously running set of application processes which remain idle consuming compute resources while listening for lifecycle requests.

2) Higher infrastructure costs: A continuously running deployment of a broker typically leads to increased costs of infrastructure resources. This usually stems from the need for systems such as load balancers and request forwarders.

On the other hand, these limitations could be mitigated to a large extent by leveraging serverless deployments instead of continuously running server-oriented processes. A serverless microservice-oriented deployment mechanism for brokers offers several theoretical benefits:

On-demand execution: The compute resources required for handling service broker requests are provisioned on demand and invoked on the receipt of request events.

2) Better resource constraints: The function-oriented deployment model allows for more constrained scaling of resources. Resources are provisioned on demand, scoped to the requirements of each request processing workflow, and may then be scaled out as per appropriate requirements.

3) Domain-oriented development: Serverless broker deployments enable domain-driven design. Service broker developers could better focus on managing the resources instead of focusing on extraneous topics like load balancing.

Figure 2:
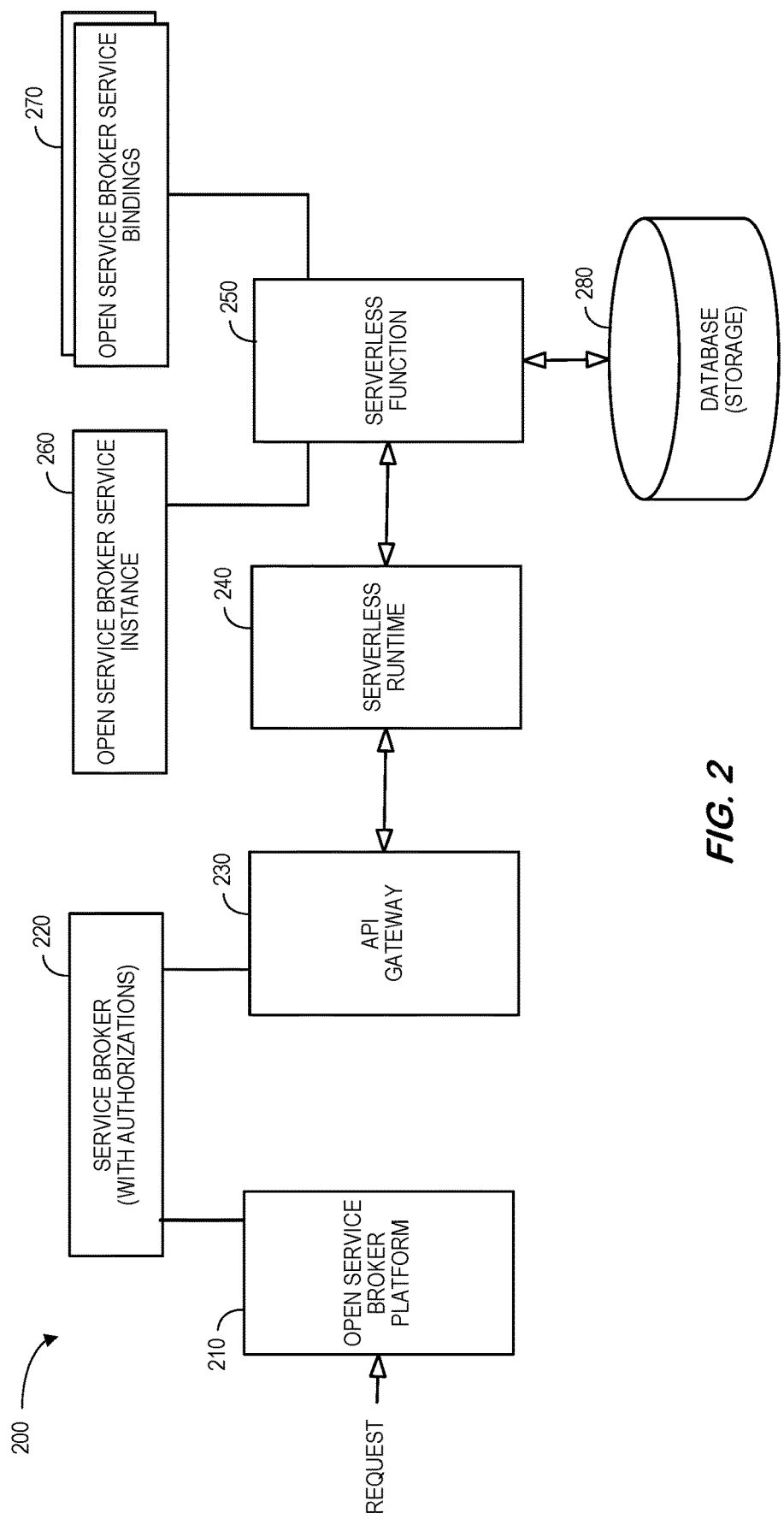
FIG. 2 is a high-level block diagram of serverless broker components accordance with some embodiments.

FIG. 2 is a high-level block diagram of a system 200 in accordance with some embodiments. The system 200 includes an OSB platform 210 that receives a request (e.g., from a client or user). Information is provided to an API gateway 230 via a service broker with authorizations 220. A serverless runtime 240 can then automatically connect with a serverless function 250 associated with an OSB service instance 260 and OSB service bindings 270. In some embodiments, the serverless function 280 may access database (storage) 280. As used herein, the term "automatically" may refer to, for example, actions that can be performed with little or no human intervention.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The serverless function 250 may store information into and/or retrieve information from various data stores (e.g., the database (storage) 280), which may be locally stored or reside remote from the serverless function orchestrator 210. Although a single serverless function 250 and database (storage) 280 are shown in FIG. 2, any number of such devices may be included. Moreover, various devices described herein might be combined according to embodiments of the present invention. For example, in some embodiments, the serverless runtime 240 and the serverless function 250 might comprise a single apparatus. The system 200 functions may be performed by a constellation of networked apparatuses, such as in a distributed processing or cloud-based architecture.

An operator or administrator may access the system 200 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define how systems interact) and/or provide or receive automatically generated recommendations or results from the system 200.

Note that serverless function handlers are triggered on domain events. Since the OSB API specification mandates stateless Hyper-Text Transfer Protocol ("HTTP") oriented REST APIs, the request-processing handlers for a serverless brokers may listen for HTTP triggers. Each service broker API may define a domain specific function handler responsible for resource-oriented operations. While the proposed topology does not mandate specific features from the deployment platform, it may require the following:

1) An API Gateway: An API gateway serves as a single entry-point for all HTTP request handlers for the service broker 220. The platform may provide an API gateway which proxies and routes service broker endpoint requests through an event sourcing mechanism which triggers the HTTP trigger and subsequently leads to the invocation of the function handler. For example, an HTTP request for provisioning a service instance 260 could be routed through the API gateway 230 and handled by a function handler that reacts to the trigger.

2) Dynamic function invocation: The service broker handler may be instantiated and loaded on demand. While public cloud infrastructure vendors such as AMAZON WEB SERVICES® ("AWS®") are adept at loading function resources on demand, this is a generic requirement that might be satisfied using simplistic methodologies (such as container technologies).

The OSB API specification facilitates asynchronous lifecycle operations on service instances where service brokers cannot guarantee completion of request processing immediately. Such resources typically require a coordinated sequence of tasks to be executed in the context of a business transaction. Such a business transaction usually spans across multiple API domains, and processes and usually require access to dedicated storage persistence. Service broker function handlers can leverage the semantics of a finite state machine for orchestrating the sequence of activities according to the requirements of the resource activities. Each executable step in the finite state machine may be required to store intermediate outputs and each local execution may trigger domain events of their own.

Figure 10:
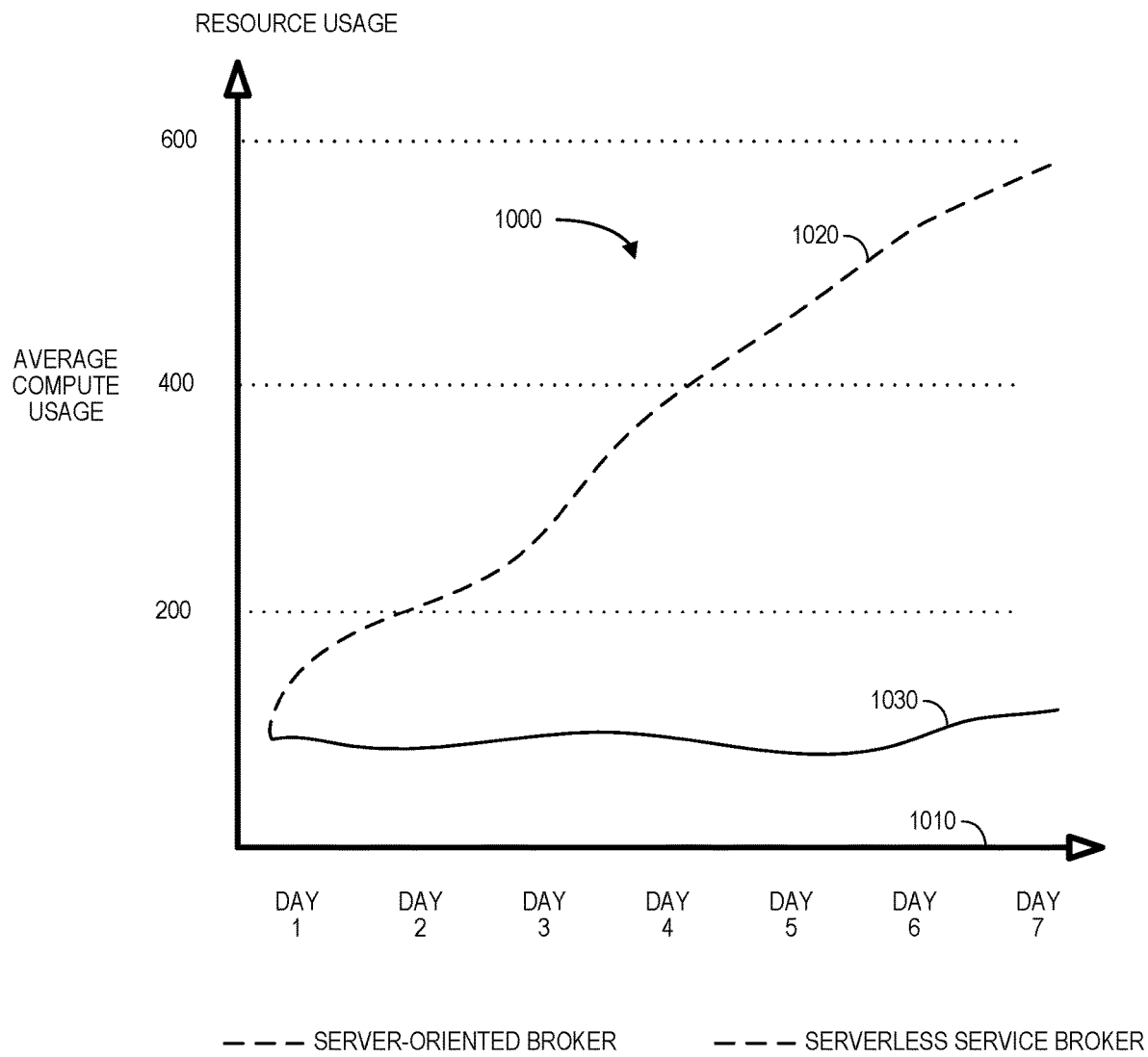
FIG. 10 is a comparative performance analysis according to some embodiments.

While not a mandatory requirement, function handlers may be executed in their own resource-constrained environments (such as containers). Constrained executions may help ensure limited crosstalk across request handlers, efficient use of hardware resources, domain-oriented error handling, etc. An observational comparative analysis of resource usage on similarly modeled server-oriented and serverless service broker deployments is depicted in FIG. 10.

Figure 3:
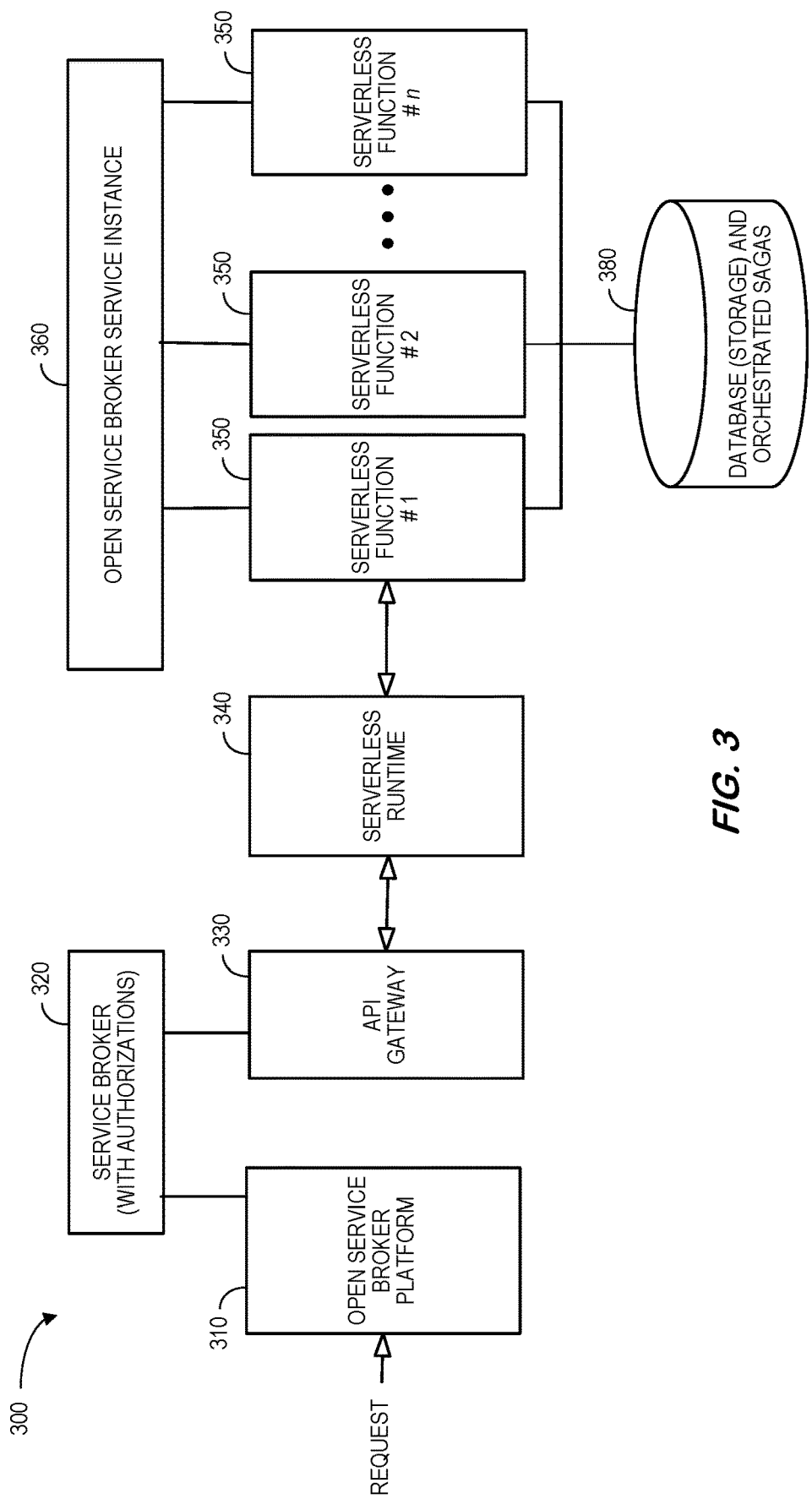
FIG. 3 comprises an asynchronous workflow for a serverless function according to some embodiments.

FIG. 3 comprises an asynchronous workflow 300 for a serverless function according to some embodiments. As before, the system 300 includes an OSB platform 310 that receives a request (e.g., from a client or user). Information is provided to an API gateway 330 via a service broker with authorizations 320. A serverless runtime 340 can then automatically connect with a plurality of serverless functions 350 (serverless functions numbered 1 through n) associated with an OSB service instance 360 and database (storage) that includes orchestrated sagas.

Figure 4:
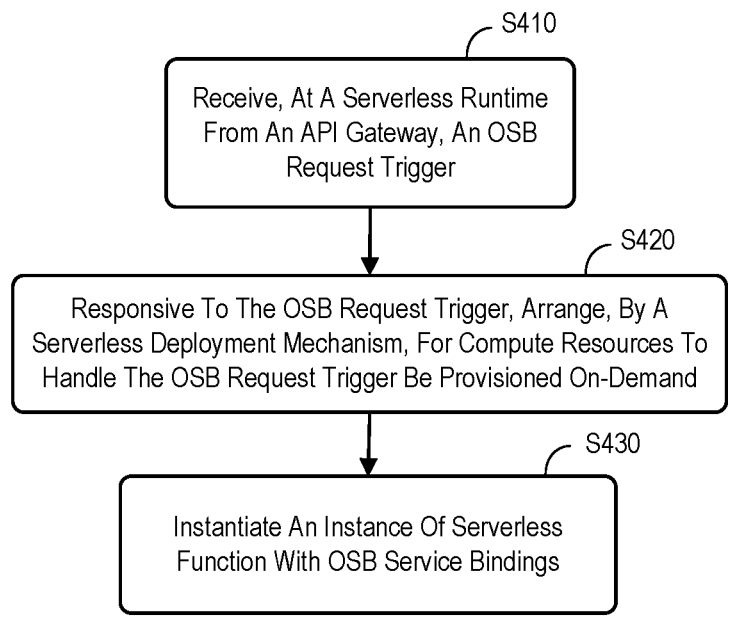
FIG. 4 is a method according to some embodiments.

FIG. 4 is a method that might performed by some or all of the elements of the systems 200, 300 described with respect to FIGS. 2 and 3, respectively. The method may be associated with, for example, an OSB API computing environment such as a cloud infrastructure provider or an on-premises deployment. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S410, a serverless runtime may receive, from an API gateway, an OSB request trigger (e.g., a stateless HTTP trigger). According to some embodiments, the OSB API comprises a REST API. Responsive to the OSB request trigger, at S420 a serverless deployment mechanism may arrange for compute resources to handle the OSB request trigger be provisioned on-demand.

At S430, an instance of a serverless function may be instantiated with OSB service bindings. According to some embodiments, the serverless function comprises a plurality of serverless functions (and the plurality serverless functions might span multiple API domains). The plurality of serverless functions may access database storage (e.g., containing orchestration sagas). In some embodiments, semantics of a finite state machine are used to orchestrate a sequence of activities.

Figure 5:
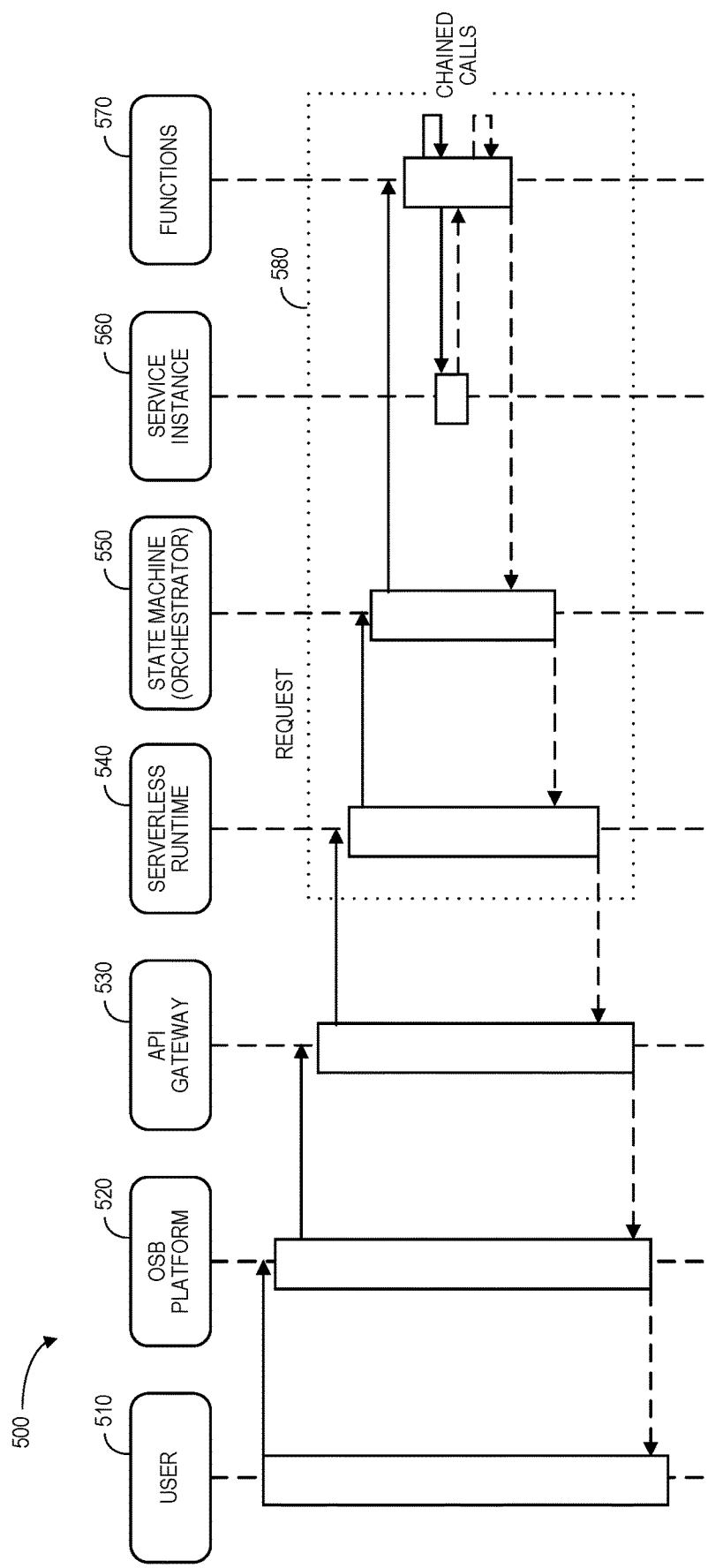
FIG. 5 is a serverless operation information flow timeline in accordance with some embodiments.

FIG. 5 is a serverless operation information flow timeline 500 in accordance with some embodiments. Initially, a user 510 may send information to an API gateway 530 via an OSB platform 520. This initiates a request 580 (illustrated by a dotted line in FIG. 5) which begins with a serverless runtime 540 sending information to functions 570 via a state machine (orchestrator) 550. The functions 570 may execute chained calls and interact with a service instance 560 before the completion of the timeline (illustrated via the returning dashed arrows in FIG. 5).

Figure 6:
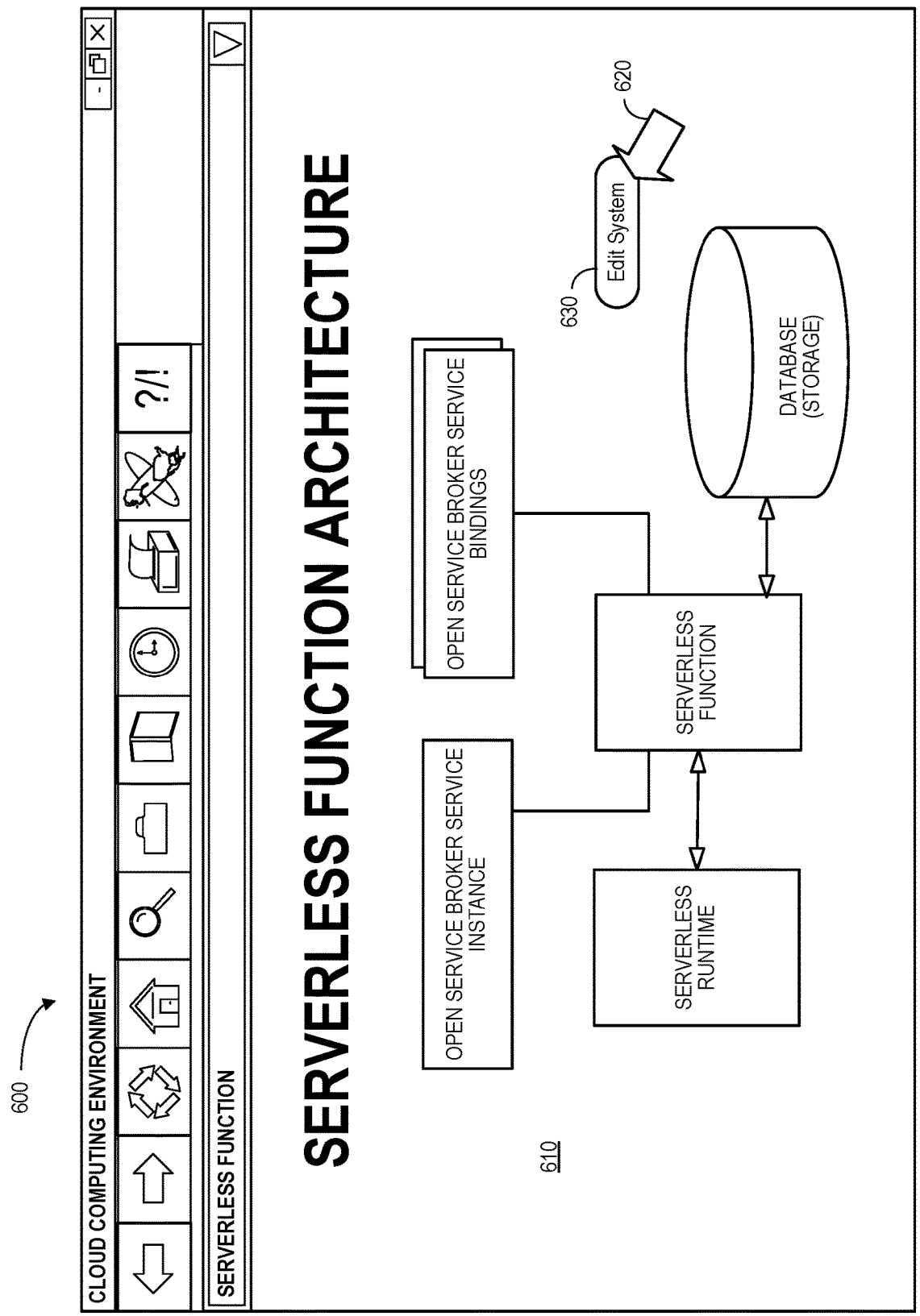
FIG. 6 is a user interface display according to some embodiments.

FIG. 6 is serverless function display 600 according to some embodiments. The display 600 includes a graphical representation 610 of the elements of a system in accordance with any of the embodiments described herein. Selection of an element on the display 600 (e.g., via a touchscreen or a computer pointer 620) may result in display of a popup window containing more detailed information about that element and/or various options (e.g., to add a data element, modify a mapping, etc.). Selection of an "Edit System" icon 630 may let an operator or administrator change a database (storage) location, adjust bindings, etc.

Figure 7:
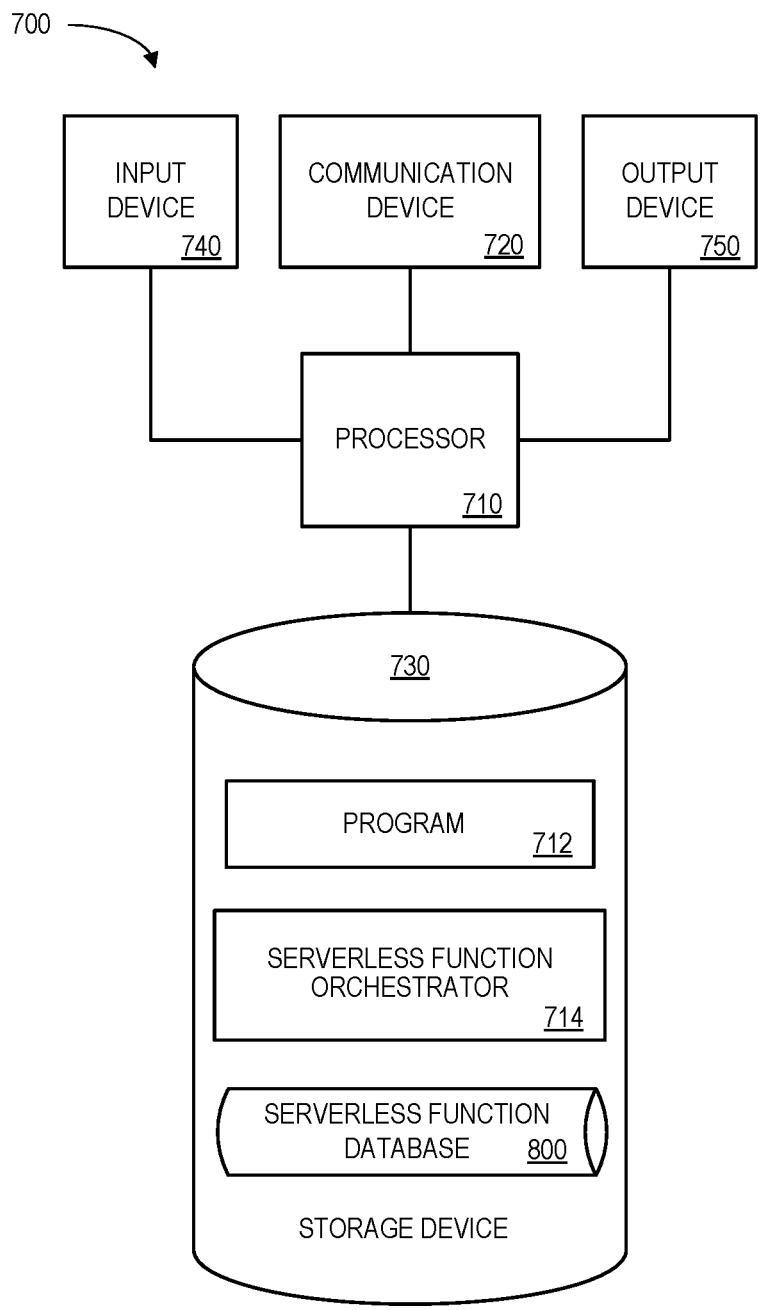
FIG. 7 is an apparatus or platform according to some embodiments.

Note that the embodiments described herein may also be implemented using any number of different hardware configurations. For example, FIG. 7 is a block diagram of an apparatus or platform 700 that may be, for example, associated with the systems 200, 300 of FIGS. 2, 3 respectively (and/or any other system described herein). The platform 700 comprises a processor 710, such as one or more commercially available Central Processing Units ("CPUs") in the form of one-chip microprocessors, coupled to a communication device 760 configured to communicate via a communication network (not shown in FIG. 7). The communication device 720 may be used to communicate, for example, with one or more remote user platforms, administrator platforms, etc. The platform 700 further includes an input device 740 (e.g., a computer mouse and/or keyboard to input cloud computing information) and/an output device 750 (e.g., a computer monitor to render a display, transmit alerts and recommendations, and/or create reports about errors, performance parameters, etc.). According to some embodiments, a mobile device, monitoring physical system, and/or PC may be used to exchange information with the platform 700.

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 712 and/or a serverless function orchestrator 714 for controlling the processor 710. The processor 710 performs instructions of the programs 712, 714, and thereby operates in accordance with any of the embodiments described herein. For example, the processor 710 may receive an OSB request trigger from an API gateway. A serverless deployment mechanism may, responsive to the OSB request trigger, arrange for compute resources to handle the OSB request trigger be provisioned on-demand. The processor 710 may then instantiate an instance of a serverless function with OSB service bindings. The OSB API computing environment might, for example, be associated with a cloud infrastructure provider or an on-premises deployment. Such an approach may provide for on-demand execution, better resource constraints, and/or domain-oriented development.

The programs 712, 714 may be stored in a compressed, uncompiled and/or encrypted format. The programs 712, 714 may furthermore include other program elements, such as an operating system, clipboard application, a database management system, and/or device drivers used by the processor 710 to interface with peripheral devices.

As used herein, information may be "received" by or "transmitted" to, for example: (i) the platform 700 from another device; or (ii) a software application or module within the platform 700 from another software application, module, or any other source.

In some embodiments (such as the one shown in FIG. 7), the storage device 730 further stores the serverless function database 800. An example of a database that may be used in connection with the platform 700 will now be described in detail with respect to FIG. 8. Note that the database described herein is only one example, and additional and/or different information may be stored therein. Moreover, various databases might be split or combined in accordance with any of the embodiments described herein.

Figure 8:
FIG. 8 is portion of a serverless function data store in accordance with some embodiments.

Referring to FIG. 8, a table is shown that represents the serverless function database 800 that may be stored at the platform 700 according to some embodiments. The table may include, for example, entries associated with requests received from clients or users. The table may also define fields 802, 804, 806, 808, 810 for each of the entries. The fields 802, 804, 806, 808, 810 may, according to some embodiments, specify: a request identifier 802, an application identifier 804, an OSB broker identifier 806, serverless function identifiers 808, and a service instance value 810. The serverless function database 800 may be created and updated, for example, when functions are executed, new services are instantiated, etc.

The request identifier 802 might be a unique alphanumeric label that is associated with a request from a client or user. The application identifier 804 might indicate a SaaS associated with the request. The OSB broker identifier 806 might indicate a broker who is handling the request. The one or more serverless function identifiers 808 might be associated with a series of functions that comprise the application. The service instance value 810 might indicate a program instantiated in response to the request. Note that the serverless function database 800 might store information instead of, or in addition to, the information illustrated in FIG. 8, such as a database (storage) identifier, allocated resource identifiers for the request, etc.

Thus, embodiments may facilitate creation of OSB compliant functions for a computing environment in a secure, automatic, and efficient manner. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 9:
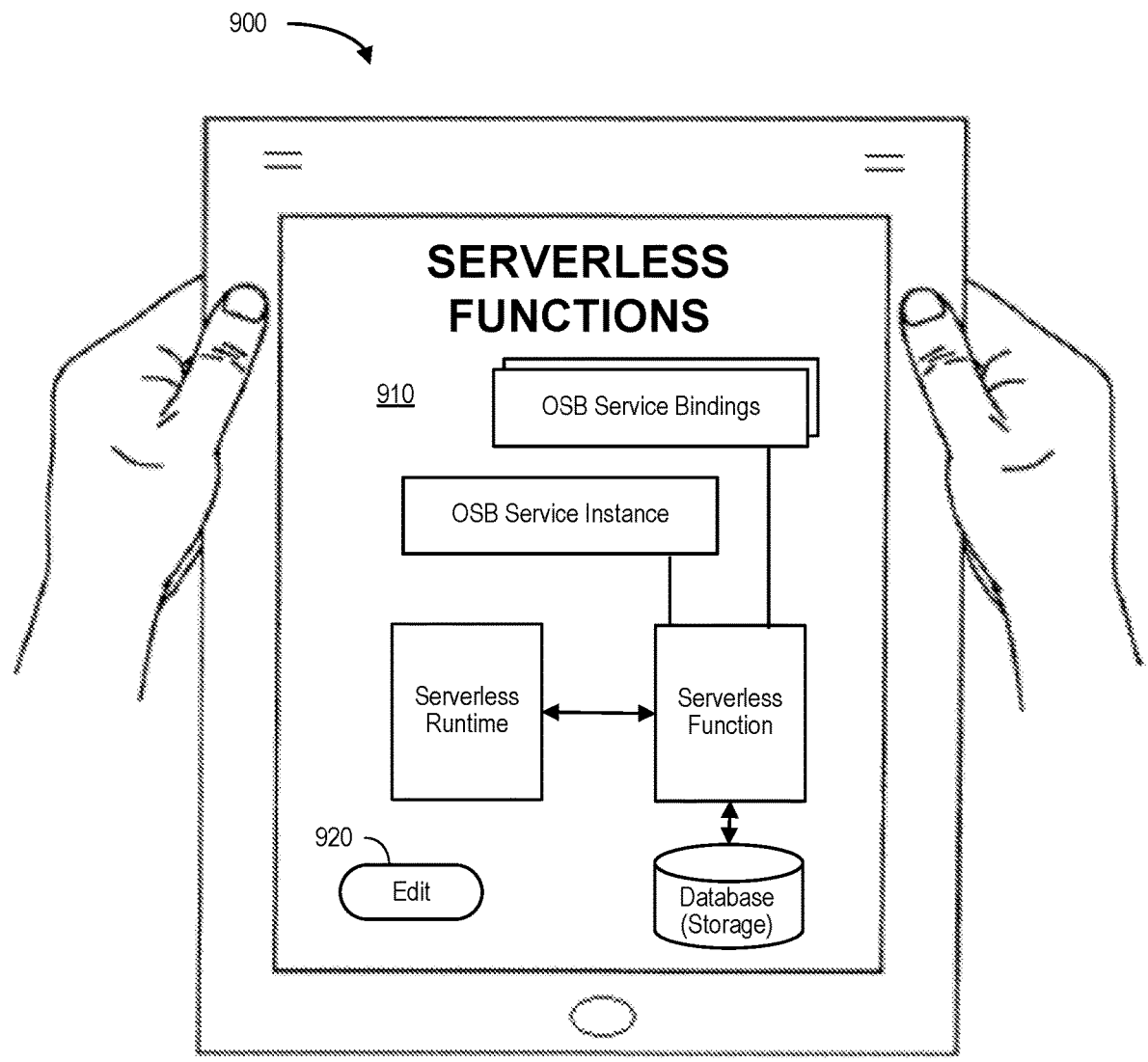
FIG. 9 is a tablet computer rendering a serverless function display in accordance with some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of serverless functions, any of the embodiments described herein could be applied to other types of serverless functions. Moreover, the displays shown herein are provided only as examples, and any other type of user interface could be implemented. For example, FIG. 9 illustrates a handheld tablet computer 900 showing a serverless function display 910 according to some embodiments. The serverless function display 910 might include user-selectable data that can be selected and/or modified by a user of the handheld computer 900 (e.g., via an "Edit" icon 920) to view updated information about performance metrics, cloud applications, virtual machines, etc.

FIG. 10 is a comparative performance analysis 1000 according to some embodiments. In particular, the analysis 1000 includes a graph 1010 that shows average resource usage over time (in particular, average computer usage versus on a daily basis). The graph includes a server-oriented broker approach 1020 (dashed line in FIG. 10) and a serverless service broker approach 1030 (solid line in FIG. 10). As can be seen, the server-oriented broker approach 1020 increases steadily over time while the serverless service broker approach 1030 does not.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with an Open Service Broker ("OSB") Application Programming Interface ("API") computing environment, comprising:
 a serverless runtime to receive an OSB request trigger from an API gateway;
 database storage that contains orchestration sagas;
 a serverless deployment mechanism, including:
  a computer processor, and
  computer memory, coupled to the computer processor, storing instructions that, when executed by the computer processor cause the processor to:
   (i) responsive to the OSB request trigger, arrange for compute resources to handle the OSB request trigger be provisioned on-demand, and
   (ii) instantiate a plurality of serverless functions with OSB service bindings, each executing in a resource-constrained container, wherein the plurality of serverless functions span multiple API domains and access the database storage;
 a finite state machine orchestrator to orchestrate, using semantics, a sequence of activities for the sagas by the plurality of serverless functions; and
 a service instance to respond to chained calls from the plurality of serverless functions in accordance with the sequence of activities.

2. The system of claim 1, wherein the OSB API computing environment is associated with at least one of: (i) a cloud infrastructure provider, and (ii) an on-premises deployment.

3. The system of claim 1, wherein the OSB request trigger comprises a stateless Hyper-Text Transfer Protocol ("HTTP") trigger.

4. The system of claim 3, wherein the OSB API comprises a Representational State Transfer ("REST") API.

5. The system of claim 1, wherein a service broker API defines a domain specific function handler responsible for resource-oriented operations.

6. The system of claim 1, wherein the API gateway serves as a single entry-point for all Hyper-Text Transfer Protocol ("HTTP") request handlers for a service broker.

7. The system of claim 6, wherein the API gateway proxies route service broker endpoint requests through an event sourcing mechanism.

8. The system of claim 6, wherein a service broker handler is instantiated and loaded on demand to provide dynamic function invocation.

9. The system of claim 1, wherein asynchronous lifecycle operations are supported service instances.

10. A computer-implemented method associated with an Open Service Broker ("OSB") Application Programming Interface ("API") computing environment, comprising:
 receiving, at a serverless runtime from an API gateway, an OSB request trigger;
 responsive to the OSB request trigger, arranging by a serverless deployment mechanism for compute resources to handle the OSB request trigger be provisioned on-demand;
 defining, by a service broker API, a domain specific function handler responsible for resource-oriented operations, wherein the handler is instantiated and loaded on demand to provide dynamic function invocation;
 instantiating a plurality of serverless functions with OSB service bindings, each executing in a resource-constrained container, wherein the plurality of serverless functions span multiple API domains;
 accessing database storage that contains orchestration sagas;
 orchestrating, by a finite state machine, a sequence of activities for the sagas using semantics; and
 responding, by a service instance, to chained calls from the plurality of serverless functions in accordance with the sequence of activities.

11. The method of claim 10, wherein the OSB API computing environment is associated with at least one of: (i) a cloud infrastructure provider, and (ii) an on-premises deployment.

12. The method of claim 10, wherein the OSB request trigger comprises a stateless Hyper-Text Transfer Protocol ("HTTP") trigger.

13. The method of claim 12, wherein the OSB API comprises a Representational State Transfer ("REST") API.

14. The method of claim 10, wherein the API gateway serves as a single entry-point for all Hyper-Text Transfer Protocol ("HTTP") request handlers for a service broker.

15. The method of claim 14, wherein the API gateway proxies route service broker endpoint requests through an event sourcing mechanism.

16. A non-transitory, computer readable medium having executable instructions stored therein that, when executed by a computer processor cause the processor to perform a method associated with an Open Service Broker ("OSB") Application Programming Interface ("API") computing environment, the method comprising:
    receiving, at a serverless runtime from an API gateway, an OSB request trigger;
    responsive to the OSB request trigger, arranging by a serverless deployment mechanism for compute resources to handle the OSB request trigger be provisioned on-demand;
    instantiating a plurality of serverless functions with OSB service bindings, each executing in a resource-constrained container, wherein the plurality of serverless functions span multiple API domains;
    accessing database storage that contains orchestration sagas;
    orchestrating, by a finite state machine, a sequence of activities for the sagas using semantics; and
    responding, by a service instance, to chained calls from the plurality of serverless functions in accordance with the sequence of activities.

17. The medium of claim 16, wherein the OSB API computing environment is associated with at least one of: (i) a cloud infrastructure provider, and (ii) an on-premises deployment.

18. The medium of claim 16, wherein the API gateway serves as a single entry-point for all Hyper-Text Transfer Protocol ("HTTP") request handlers for a service broker.

19. The medium of claim 18, wherein the API gateway proxies route service broker endpoint requests through an event sourcing mechanism and a service broker handler is instantiated and loaded on demand to provide dynamic function invocation.

20. The medium of claim 17, wherein the OSB request trigger comprises a stateless Hyper-Text Transfer Protocol ("HTTP") trigger the OSB API comprises a Representational State Transfer ("REST") API.

\* \* \* \* \*